Patented Nov. 29, 1927.

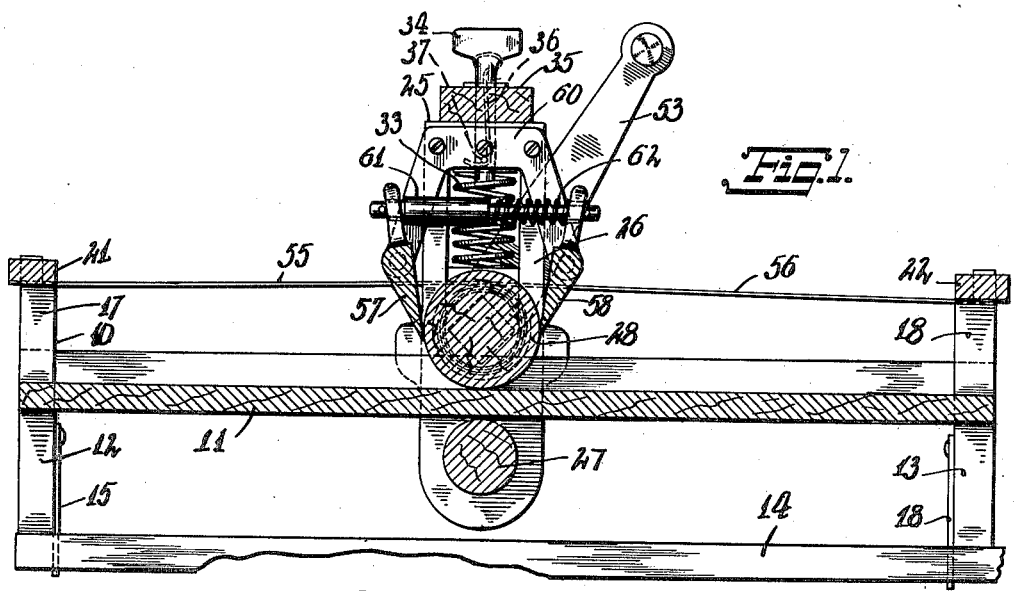

1,650,758

UNITED STATES PATENT OFFICE.

JOSEPH KUKLA, OF MONONGAH, WEST VIRGINIA.

DOUGH-ROLLING MACHINE.

Application filed July 9, 1926. Serial No. 121,321.

This invention relates to a dough rolling machine, and has for its object to provide an apparatus of this character which shall be especially adapted for working the dough into a flat layer, which may then be cut into strips with a suitable implement.

A further object is a novel mechanism for actuating the roller elements and maintaining a degree of flexibility in the pressure applied thereby.

The apparatus is so constructed that it may be taken apart for cleaning and is provided with a means for attaching to a table, shelf, or the like when it is desired to place it in operation.

The foregoing objects and other features and advantages of the device will be fully described in the following specification and claims, and illustrated in the accompanying drawings, in which:

Fig. 1 is a vertical section showing a side view of the elements of the device.

Fig. 2 is a plan view on a smaller scale.

Fig. 3 is an enlarged fragmentary view in vertical section on the line 3—3 of Figure 2.

Fig. 4 is a section on the line 4—4 of Figure 3.

Fig. 5 is a perspective view of the implement used for cutting the dough into suitable strips.

The principal parts of the apparatus are constructed preferably of wood, although other suitable material may be employed if desired.

Referring more particularly to Figure 1 of the drawings, a frame 10 supports a bed plate 11 there being legs at the four corners for this purpose as those shown at 12 and 13. These legs are secured to a table 14 by means of hooks as those shown at 15 and 16. Extending upward from the corners are posts as shown at 17 and 18 of Figure 1 and 19 and 20 of Figure 2. Cross pieces 21 and 22 extend across the frame at the ends and rest upon the corner posts, being secured by vertical extensions of the said posts which pass through slots in the said cross pieces. Side rails as shown at 8 and 9 in Figure 2 are provided at the edges of the bed plate.

The traversing element 25 comprises vertical side frames as that shown at 26, these being placed at opposite sides of the machine and having rotatably mounted at their lower ends an idler roller 27 which bears against the bottom of the bed plate 11. Above the said bed plate is mounted the dough roller 28 which has shoulders as that shown in Figure 3 at 29 which bear against the side frames. Referring again to Figure 3, bearing blocks as that shown at 30 rest on the journals as shown at 38 of the dough roller. Within a slotted portion of the side frames as that shown at 31 are placed compression springs as that shown at 32 and again at 33, in Figure 1. Still referring to Figure 3, pins as that shown at 34 keep the said springs in place. These pins may be turned so as to permit of the removal of the cross bar 35 which is otherwise secured by hooks as that shown at 36 which engage pins as at 37.

The journals of the dough roller are extended outward from the points of bearing and are provided with sleeves as that shown at 45 which have a limited degree of movement controlled by the slots as that shown at 46 and the studs 47. A tension is maintained on this sleeve by means of the springs 48 and 49 as seen in Figure 4.

To the sleeve as that shown at 45 are connected by means of rivets, or the like 51 and 52, belts as seen at 53 and 54 of Figure 3 and 55 and 56 of Figure 2 of the drawings. These belts are connected at their opposite ends to the end pieces 21 and 22. A crank 53 seen in Figures 1 and 2 is secured to the dough roller and when rotated acts through the belts to move the elements supporting the said roller from one end of the machine to the other, the belts winding and unwinding as the motion is in one direction, or the other. By this means the dough roller is made to pass back and forth over the dough which is placed on the bed plate and which, by this manipulation is reduced to the desired thickness and consistency, after which it may be cut into strips by means of the implement shown in Figure 5 of the drawings.

Scrapers 57 and 58 engage the sides of the dough roller and remove any material which has adhered thereto. These scrapers are pivotally mounted on suitable frames at the ends as that shown at 60 and are held in spring tension against the sides of the roller by means of the cross bar 61 and the spring 62.

While I have shown and described the preferred form of my invention, I do not wish to be held rigidly to the exact details of construction as illustrated, but claim the right to such minor modifications as may come within the scope of the appended claims.

Having thus described my invention, what I claim as new and desire to secure by Letters Patent, is as follows:

1. In a machine of the class described, a supporting frame, a bed plate mounted thereon, vertical side frames placed opposite to each other and connected at the top by a cross bar and at the bottom by an idler roller which bears against the under side of the said bed plate, and a dough roller rotatably mounted between the said side frames and above the bed plate, and having slidable bearing blocks resting upon the journals thereof and depressed by suitable springs, and belts secured near to the extremities of the dough roller journals and extending therefrom to points of connection to the end members of the supporting frame, the said belts attached to the roller elements in such a manner that the one will wind around the element while the other is unwinding therefrom, and means to rotate the dough roller and to move same from end to end of the bed plate through the action of the opposed belts as above described, and means to scrape off particles of dough which may adhere to the said roller when in operation.

2. In a machine of the class described, a supporting frame, a bed plate mounted therein and a traversing element comprising vertical side frames connected at the top by a cross bar and at the bottom by an idler roller and having a dough roller adapted to bear against the surface of the bed plate mounted in conjunction therewith and adapted to be moved from end to end thereof by means of belts which are connected in pairs on each side of the machine, the said pairs each having intermediate ends secured to a sleeve on the end of the dough roller and so affixed that the winding of one thereon will cause the unwinding of the other, and the said sleeve being held in tension by springs attached to it and to the said dough roller and having its movement with relation to the said roller limited by a slidable stop element, and means to scrape adhering particles from the sides of the said roller.

3. In a machine of the class described, a supporting frame and means to secure same in fixed position, a bed plate mounted therein in an elevated position, side rails on the said bed plate, and a movable roller supporting element mounted in conjunction with the said bed plate and constructed as follows, vertical side frames connected at the top by means of a cross bar and at the bottom by an idler roller which bears against the under side of the bed plate, and a dough roller rotatably mounted between the said side frames above the said bed plate and having a degree of vertical play and forced downward by means of bearing blocks having compression springs resting thereon, and sleeves mounted over the extremities of the said roller and held in tension thereon, and belts secured to the said sleeves and adapted to be wound thereon in opposite directions and the said belts connected at their opposite extremities to the end elements of the frame structure, and a suitable crank secured to the said dough roller.

In testimony whereof I have affixed my signature.

JOSEPH KUKLA.